US012788655B2

(12) United States Patent
Driscoll, Jr. et al.

(10) Patent No.: US 12,788,655 B2
(45) Date of Patent: Nov. 10, 2026

(54) ALTERNATE PRESSURE MATTRESS SYSTEM AND METHODS OF USE

(71) Applicant: Sizewise Rentals, L.L.C., Lenexa, KS (US)

(72) Inventors: David Delroy Driscoll, Jr., Milwaukee, WI (US); Morgan Nicole Balog, Milwaukee, WI (US)

(73) Assignee: Sizewise Rentals, L.L.C., Eden Prairie, MN (US)

( * ) Notice: Subject to any disclaimer, the term of this patent is extended or adjusted under 35 U.S.C. 154(b) by 65 days.

(21) Appl. No.: 18/889,285

(22) Filed: Sep. 18, 2024

(65) Prior Publication Data

US 2025/0090399 A1 Mar. 20, 2025

Related U.S. Application Data

(60) Provisional application No. 63/583,355, filed on Sep. 18, 2023.

(51) Int. Cl.
*A61G 7/057* (2006.01)

(52) U.S. Cl.
CPC ................................ *A61G 7/05776* (2013.01)

(58) Field of Classification Search
CPC ............................ A47C 27/10; A61G 7/05776
See application file for complete search history.

(56) References Cited

U.S. PATENT DOCUMENTS

| | | | | |
|---|---|---|---|---|
| 5,010,608 A * | 4/1991 | Barnett | A61G 7/05776 5/713 |
| 6,928,681 B1 * | 8/2005 | Stacy | A61G 7/05776 5/713 |
| 2010/0205720 A1 | 8/2010 | Astor | |
| 2010/0205750 A1 * | 8/2010 | McCausland | A61G 7/05776 5/713 |
| 2014/0047645 A1 * | 2/2014 | Choi | A47C 27/083 5/713 |
| 2016/0022521 A1 * | 1/2016 | Darnold | G05B 15/02 297/217.2 |
| 2016/0038359 A1 * | 2/2016 | Rawls-Meehan | H04W 4/80 5/613 |
| 2023/0181396 A1 * | 6/2023 | Bertoni | A61G 7/05776 5/710 |

* cited by examiner

*Primary Examiner* — J. T. Newton
(74) *Attorney, Agent, or Firm* — Spencer Fane LLP

(57) ABSTRACT

An alternate pressure mattress system and methods of use may include an air mattress having a plurality of first air cells and a plurality of second air cells adjacent to the plurality of first air cells. A control housing is configured to exhaust air from within the air cells; deflate the plurality of first air cells for a first predetermined period of time; inflate the plurality of second air cells to a desire high pressure; deflate the plurality of first air cells to a desired low pressure; hold the desired high pressure and the desired low pressure for a second predetermined period of time. The pressure within the air cells may be alternated by swapping inflation and deflation of the plurality of first air cells and the plurality of second air cells and repeating the above steps. Methods of alternating the pressure within an air mattress are described.

16 Claims, 4 Drawing Sheets

ALTERNATE PRESSURE MATTRESS SYSTEM AND METHODS OF USE

PRIORITY DATA

This U.S. non-provisional application claims priority to U.S. Provisional Patent Application No. 63/583,355, filed Sep. 18, 2023, which is hereby incorporated by reference herein.

TECHNICAL FIELD

The disclosed subject matter relates generally to airbed systems and more particularly, but not necessarily exclusively, to airbed systems with an alternate pressure mattress.

SUMMARY

In some aspects of the disclosed subject matter described herein relate to an alternate pressure mattress system including: an air mattress including a plurality of alternating air cells; wherein the plurality of alternating air cells include: a plurality of first air cells; and a plurality of second air cells adjacent to the plurality of first air cells; and a control housing configured to alternate inflation and deflation of the plurality of first air cells and the plurality of second air cells based on a selectable firmness level.

In some aspects of the disclosed subject matter described herein relate to an alternate pressure mattress system, wherein the selectable firmness level corresponds to a desired immersion pressure, a desired high pressure, and a desired low pressure.

In some aspects of the disclosed subject matter described herein relate to an alternate pressure mattress system, wherein the desired immersion pressure is between about 7 to 42 mm Hg.

In some aspects of the disclosed subject matter described herein relate to an alternate pressure mattress system, wherein the desired high pressure is between about 13 to 48 mm Hg.

In some aspects of the disclosed subject matter described herein relate to an alternate pressure mattress system, wherein the desired low pressure is between about 4 to 34 mm Hg.

In some aspects of the disclosed subject matter described herein relate to an alternate pressure mattress system, wherein the control housing is configured to exhaust the plurality of alternating air cells for a predetermined period of equalization time, deflate the plurality of first air cells for a first predetermined period of time, inflate the plurality of second air cells to the desired high pressure, deflate the plurality of first air cells to the desired low pressure, and hold the desired high pressure and the desired low pressure for a second predetermined period of time.

In some aspects of the disclosed subject matter described herein relate to an alternate pressure mattress system, wherein the predetermined period of equalization time is between about 45 to 50 seconds.

In some aspects of the disclosed subject matter described herein relate to an alternate pressure mattress system, wherein the first predetermined period of time is less than about 10 seconds.

In some aspects of the disclosed subject matter described herein relate to an alternate pressure mattress system, wherein the second predetermined period of time is between about 5 to 60 seconds.

In some aspects of the disclosed subject matter described herein relate to an alternate pressure mattress system, wherein the control housing is further configured to deflate the plurality of second air cells for a first predetermined period of time, inflate the plurality of first air cells to the desired high pressure, and deflate the plurality of second air cells to the desired low pressure.

In some aspects of the disclosed subject matter described herein relate to an alternate pressure mattress system, wherein the control housing includes a pump connected to the plurality of first air cells and the plurality of second air cells.

In some aspects of the disclosed subject matter described herein relate to an alternate pressure mattress system, wherein the control housing includes a pressure sensor to monitor a pressure status within the plurality of alternating air cells.

In some aspects of the disclosed subject matter described herein relate to an alternate pressure mattress system, wherein the control housing includes a control unit configured to control the pump.

In some aspects of the disclosed subject matter described herein relate to an alternate pressure mattress system, further includes a user remote configured to control the inflation and deflation of the air mattress.

In some aspects of the disclosed subject matter described herein relate to an alternate pressure mattress system including: an air mattress including a plurality of alternating air cells; wherein the plurality of alternating air cells include: a plurality of first air cells; and a plurality of second air cells adjacent to the plurality of first air cells; a pump connected to the plurality of first air cells and the plurality of second air cells; and a control housing configured to exhaust the plurality of alternating air cells for a predetermined period of equalization time, deflate the plurality of first air cells for a first predetermined period of time, inflate the plurality of second air cells to a desired high pressure, deflate the plurality of first air cells to a desired low pressure, and hold the desired high pressure and the desired low pressure for a second predetermined period of time.

In some aspects of the disclosed subject matter described herein relate to an alternate pressure mattress system, wherein the control housing is further configured to deflate the plurality of second air cells for the first predetermined period of time, inflate the plurality of first air cells to the desired high pressure, and deflate the plurality of second air cells to the desired low pressure.

In some aspects of the disclosed subject matter described herein relate to a method of alternating a pressure within an air mattress including the steps of: providing an air mattress including a plurality of first air cells and a plurality of second air cells adjacent to the plurality of first air cells; exhausting the plurality of first air cells and the plurality of second air cells to a manifold for a predetermined period of equalization time; deflating the plurality of first air cells for a first predetermined period of time; inflating the plurality of second air cells to a desired high pressure; deflating the plurality of first air cells to a desired low pressure; holding the desired high pressure and the desired low pressure for a second predetermined period of time; exhausting the plurality of first air cells and the plurality of second air cells to the manifold for the predetermined period of equalization time; deflating the plurality of second air cells for the first predetermined period of time; inflating the plurality of first air cells to the desired high pressure; deflating the plurality of second air cells to the desired low pressure; and holding the desired high pressure and the desired low pressure for the second predetermined period of time.

In some aspects of the above-referenced method, the predetermined period of equalization time is between about 45 to 50 seconds.

In some aspects of the above-referenced method, the first predetermined period of time is less than about 10 seconds.

In some aspects of the above-referenced method, the second predetermined period of time is between about 5 to 60 seconds.

BRIEF DESCRIPTION OF THE DRAWINGS

The present disclosed subject matter is described herein with reference to the following drawing figures, with greater emphasis placed on clarity rather than scale.

DETAILED DESCRIPTION

Figure 1:
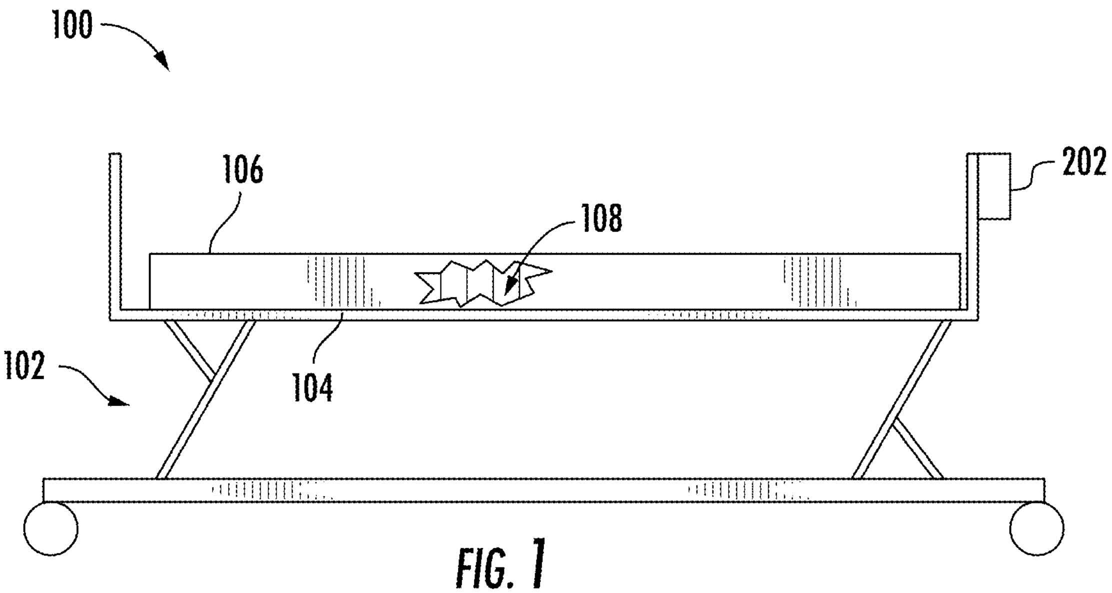
FIG. 1 is a side view of an embodiment of an alternate pressure mattress system.

As required, detailed aspects of the disclosed subject matter are disclosed herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims and as a representative basis for teaching one skilled in the art how to variously employ the disclosed technology in virtually any appropriately detailed structure.

Although the disclosed subject matter has been disclosed with reference to various particular embodiments, it is understood that equivalents may be employed, and substitutions made herein without departing from the scope of the disclosed subject matter as recited in the claims.

Certain terminology will be used in the following description, and are shown in the drawings, and will not be limiting. For example, up, down, front, back, right and left refer to the disclosed subject matter as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

The disclosed subject matter will now be described with reference to the drawing figures, in which like reference numerals refer to like parts throughout. For purposes of clarity in illustrating the characteristics of the present disclosed subject matter, proportional relationships of the elements have not been maintained in the figures. In some cases, the sizes of certain small components have been exaggerated for illustration.

Figure 2:
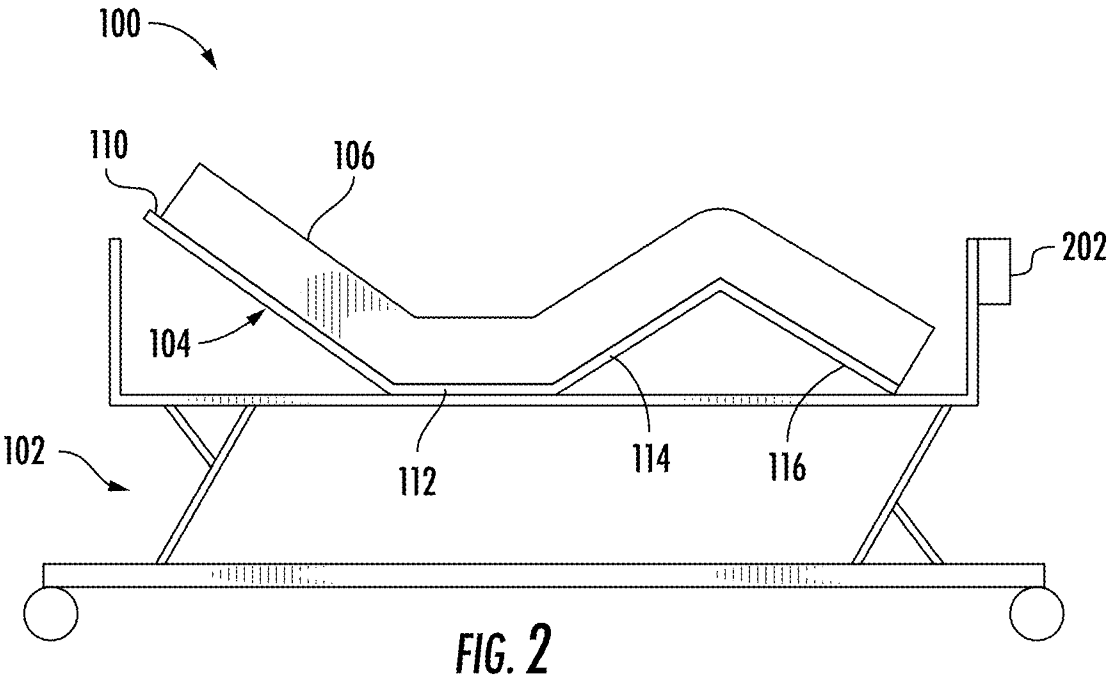
FIG. 2 is a side view of an embodiment of an alternate pressure mattress system.

Referring to the drawings, FIGS. 1-2 illustrate side views an embodiment of an alternate pressure mattress system 100 comprising a bed frame 102, a patient support assembly 104, an air mattress 106 having a plurality of alternating air cells 108, and a control housing 202. In the illustrated embodiments, the patient support assembly 104 may include a head section 110, an upper core section 112, a lower core section 114, and a foot section 116. The head section 110 may be pivotally connected to the upper core section 112. The head section 110 may rotate in order to articulate the head section 110 upwardly and away from the bed frame 102 in order to raise a patient's torso. The upper core section 112 may be non-pivotally connected to the bed frame 102. The lower core section 114 may be pivotally connected to the upper core section 112. The lower core section 114 may rotate in order to articulate the lower core section 114 away from the bed frame 102 in order to raise the patient's legs. The lower core section 114 and foot section 116 may be pivotally connected, whereby rotation of the lower core section 114 about the upper core section 112 may articulate the foot section 116 about the lower core section 114.

Figure 3:
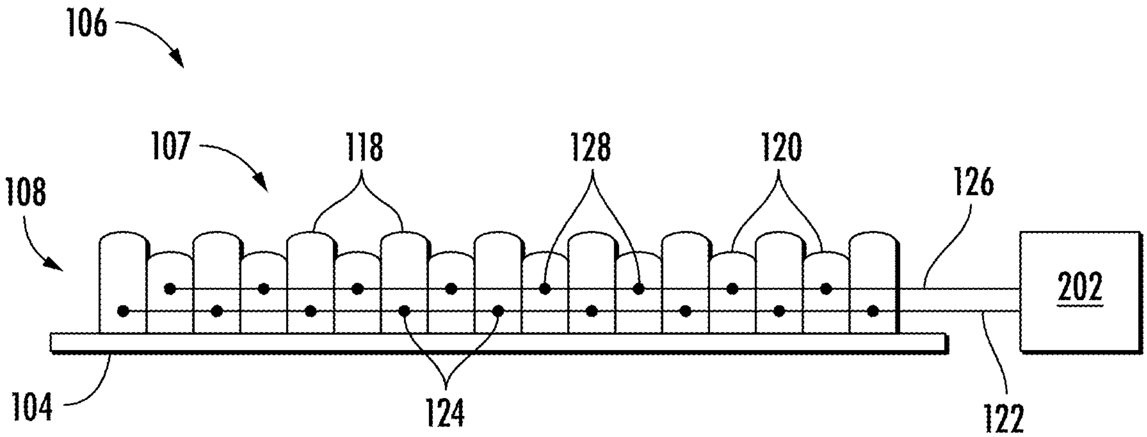
FIG. 3 is a schematic view of an embodiment of an air mattress.
Figure 4:
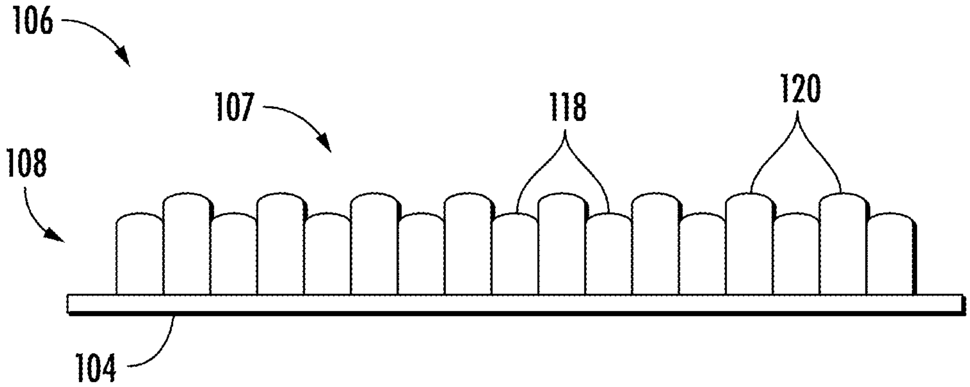
FIG. 4 is a schematic view of an embodiment of an air mattress.

Referring to the drawings, FIGS. 3-4 are schematic views of embodiments of the air mattress 106 having a plurality of alternating air cells 108. The plurality of alternating air cells 108 comprise a plurality of first air cells 118 and a plurality of second air cells 120, wherein the plurality of first air cells 118 are alternately arranged with and adjacent to the plurality of second air cells 120 such that each air cell of the plurality of first air cells 118 is adjacent to an air cell of the plurality of second air cells 120 in an interleaving arrangement. Other embodiments of the disclosed subject matter may interleave a plurality of third (or fourth, fifth, etc.) air cells (not shown) into the plurality of first air cells and the plurality of second cells in an interleaving arrangement. In an embodiment of the disclosed subject matter, the air mattress 106 may comprise two or more support zones (not shown) of alternating air cells 108, wherein each support zone of the two or more support zones may be controlled and/or pressurized in unison or separately from other support zones of the two or more support zones. In some embodiments, the two more support zones may include a head zone, a lumbar zone, and a foot zone (not shown). The plurality of alternating air cells 108 are configured to create a support surface 107 on the top of the air mattress 106. A first tube 122 is connected to, and in fluid communication with, each air cell of the plurality of first air cells 118 via a plurality of first connections 124. A second tube 126 is connected to, and in fluid communication with, each of the plurality of second air cells 120 via a plurality of second connections 128. The air mattress 106 may be supported on the patient support assembly 104 whereby inflation of the plurality of alternating air cells 108 increases the air pressure within the plurality of alternating air cells 108. By alternating the air pressure within the plurality of first air cells 118 and the plurality of second air cells 120 the air mattress 106 creates alternating pressure points on a patient's body. As shown in FIG. 3, the plurality of first air cells 118 is inflated to air pressure higher than the plurality of second air cells 120 resulting in the plurality of first air cells 118 creating pressure points between the support surface 107 and a patient's body. As shown in FIG. 4, if the air pressure within the plurality of first air cells 118 and the plurality of second air cells 120 is swapped or alternated, then the plurality of second air cells 120 will create pressure points between the support surface 107 and the patient's body.

Figure 5:
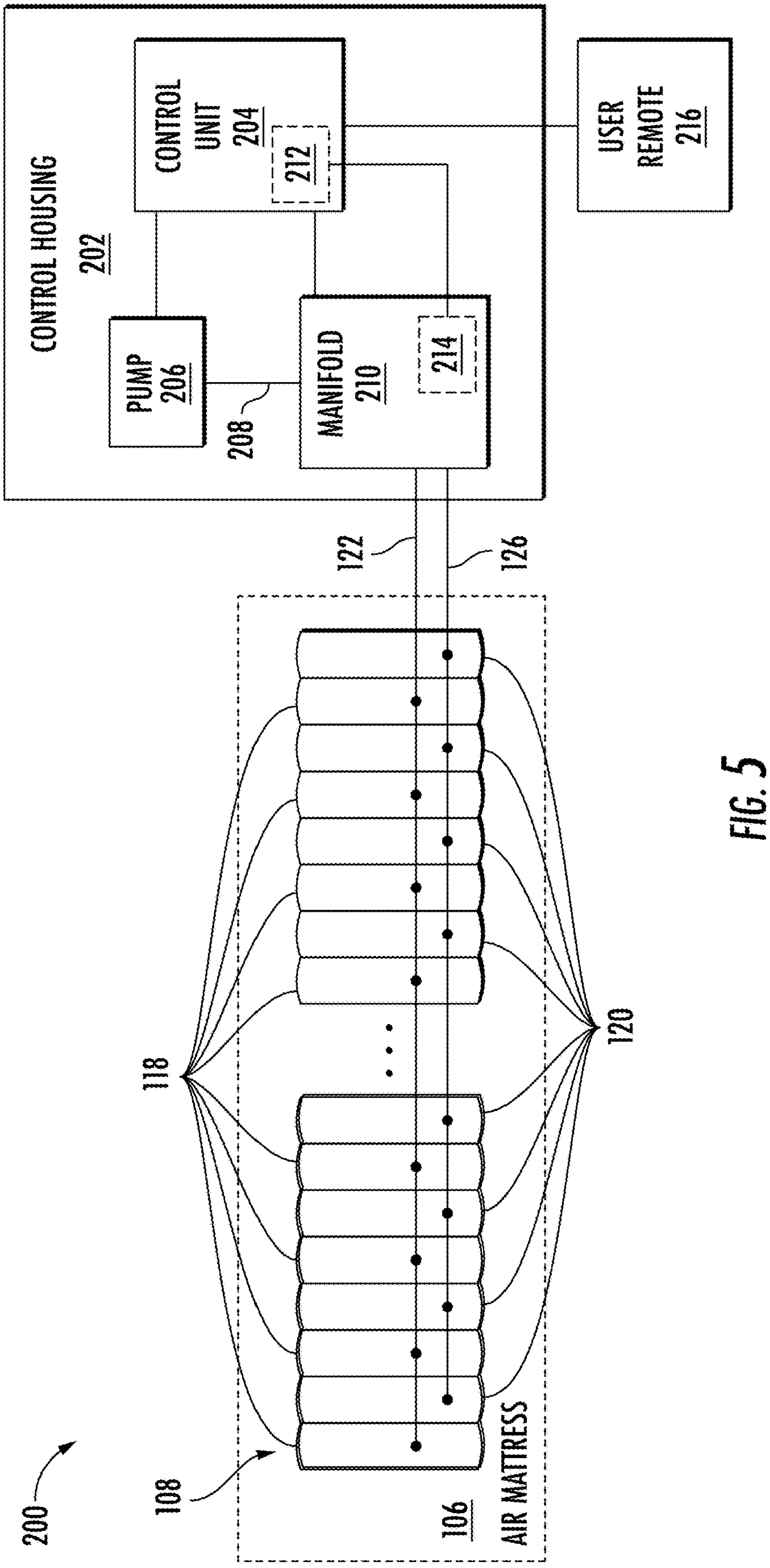
FIG. 5 is a block diagram of an exemplary airbed system useable with embodiments of the described principles.

An exemplary airbed system with which embodiments of the disclosed subject matter may be used are depicted by FIG. 5. It will be appreciated that the described airbed system is an example and does not imply any limitation regarding the use of other systems or environments to practice the disclosed subject matter.

In FIG. 5, the airbed system 200 may include a control housing 202 and an air mattress 106. The control housing 202 is configured to alternate inflation and deflation of the plurality of the first air cells and the plurality of the second air cells based on a selectable firmness level. The control housing 202 further includes a control unit 204 and a pump 206, wherein the pump 206 is connected to the plurality of first air cells 118 and the plurality of second air cells 120 via an appropriate connection (e.g., tubing, conduit, piping). For example, in FIG. 5, the pump 206 is connected to the plurality of first air cells 118 through tubes 208 and 122 and a manifold 210, and the pathways include valves (not depicted) suitable for isolating and/or connecting the plurality of first air cells 118 to and/or from the manifold 210, isolating and/or connecting the first tube 122 and the second tube 126, and isolating and/or connecting the manifold 210 to atmosphere, etc. In a similar manner, the pump 206 is connected to the plurality of second air cells 120 through tubes 208 and 126 and the manifold 210, and pathways include valves (not depicted) suitable for isolating and/or connecting the plurality of second air cells 120 to and/or from the manifold 210, isolating and/or connecting the first tube 122 and the second tube 126, and isolating and/or connecting the manifold 210 to atmosphere, etc.

In an exemplary implementation of the airbed system 200, the valves may be provided at the connection between the manifold 210 and the tubes (122, 126, 208), and the valves may be in fluid communication with the control unit 204 such that the control unit is configured to open and close the valves. Solenoid plunger style valves may be used due to their electromechanical control capabilities and relatively low cost, but it will be appreciated that other types of control valves may be used depending on the application. The tubes (122, 126, 208) may be constructed of polyvinyl chloride (PVC) or silicone rubber and may comprise of other appropriate connections for transferring a gas, such as air, from a pump outlet to the plurality of alternating air cells 108. The manifold 210 may be constructed of thermoplastic or any other suitable material with sufficient mechanical strength to withstand the amount of pressure required for the application. For example, for applications requiring about 1 psi of air, materials such as Nylon PA6, Acrylonitrile Butadiene Styrene (ABS), Polypropylene (PP), Polycarbonate (PC), or Polyphenylene Ether (PPE), may be used. One skilled in the art will appreciate that the type of material used may vary depending on the pressure requirements of the particular application (e.g., a properly designed PPE manifold may withstand up to several hundred pounds per square inch of pressure).

A pressure sensor 212 (or multiple pressure sensors) are incorporated in the control unit 204 and may be exposed to the manifold 210 (or the plurality of first air cells 118 or the plurality of second air cells 120 directly) via pressure taps to monitor the pressure status of the plurality of alternating air cells 108. The pressure sensor 212 provides the control unit 204 with pressure information corresponding to the manifold 210, the plurality of first air cells 118, and/or the plurality of second air cells 120. In FIG. 5, for example, the pressure sensor 212 is depicted as having a pressure tap 214 within the manifold 210. Other alternative environments (not depicted) may include multiple pressure taps (corresponding to one or more pressure sensors at the control unit) disposed, for example, in tubing connecting the manifold to respective air cells of the air mattress 106.

The control unit 204 may include a printed circuit board assembly (PCBA) with a tangible, computer-readable medium having electronically executable instructions stored thereon (e.g. RAM, ROM, PROM, volatile, nonvolatile, or other electronic memory mechanism), and a corresponding processor for executing those instructions. The control unit 204 may control the pump 206 and the flow of fluid (e.g., gas) in the airbed environment through the tubes 122, 126, and 208 by opening and closing the appropriate valves. The control unit 204 may further send and receive data to and from a user remote 216, allowing a user of the airbed system 200 to control the inflation/deflation of the air mattress 106 through the control unit 204, as well as displaying information related to the airbed system 200 to the user.

An exemplary control unit may include a selectable firmness level correlating to desired pressures within the plurality of alternating air cells 108. For example, a selectable firmness level may correlate to a desired immersion pressure ($P_{IMMERSION}$), a desired high pressure ($P_{HIGH}$), and a desired low pressure ($P_{LOW}$) in accordance with Table 1 below.

TABLE 1

| Selectable Firmness Level | $P_{IMMERSION}$ (mm Hg) | $P_{HIGH}$ (mm Hg) | $P_{LOW}$ (mm Hg) |
|---|---|---|---|
| 1 | 9 ± 3 | 16 ± 3 | 7 ± 3 |
| 2 | 13 ± 3 | 21 ± 3 | 7 ± 3 |
| 3 | 18 ± 2 | 26 ± 2 | 7 ± 2 |
| 4 | 21 ± 2 | 28 ± 2 | 10 ± 2 |
| 5 | 24 ± 2 | 30 ± 2 | 10 ± 2 |
| 6 | 30 ± 2 | 35 ± 2 | 12 ± 2 |
| 7 | 35 ± 2 | 41 ± 2 | 13 ± 2 |
| 8 | 40 ± 2 | 46 ± 2 | 32 ± 2 |

The user remote 216 may include a display that may indicates a current pressure status of the plurality of first air cells 118 and the plurality of second air cells 120, the current selectable firmness level (e.g., levels 1-8), the current time of alternation, the current time of immersion, and the current mode of operation (immersion, alternation, etc.) and may also include input buttons that allow the user to communicate the user's desired selectable firmness level, time of alternation, and time of immersion to the control unit 204. The user remote 216 may be connected to the control unit 204 through a wired connection or may communicate with the control unit 204 wirelessly through appropriate communications hardware. The user remote 216 comprise a mobile computing device running an application that wirelessly provides instructions to the control unit 204.

It will be appreciated that the airbed system 200 is merely exemplary and that the principles described herein are not limited to the airbed system 200 depicted. For example, it will be appreciated that in an alternative embodiment the manifold 210 may be connected directly to the pump outlet without the use of the tube 208.

In an embodiment of the disclosed subject matter, the control unit 204 may operate in an alternation mode wherein the control unit 204 is configured to, during an equalization operation, place the plurality of first air cells 118 in fluid communication with the plurality of second air cells 120 for a predetermined period of equalization time ($T_{EQUALIZATION}$), whereby, after $T_{EQUALIZATION}$, the pressure in the plurality of first air cells 118 is approximately equal to the pressure in plurality of second air cells 120. In an embodiment, $T_{EQUALIZATION}$ is between about 40 to 50 seconds, and preferably about 45 seconds. For example, if the pressure in the plurality of first air cells 118 is initially greater than the pressure in the plurality of second air cells 120, during $T_{EQUALIZATION}$, the pressure in the plurality of first air cells 118 decreases, while the pressure in the plurality of second air cells 120 increases until the pressure in both the plurality of first air cells 118 and the plurality of second air cells 120 equalize to approximately the same pressure.

In an embodiment of the disclosed subject matter, after the equalization operation, the control unit 204 is further configured to isolate the plurality of first air cells 118 from the plurality of second air cells 120 and independently connect both the plurality of first air cells 118 and the plurality of second air cells 120 to the manifold 210 so that both the plurality of first air cells 118 and the plurality of second air cells 120 may be inflated and/or deflated independent of each other. Deflation may be accomplished by independently exhausting the plurality of first air cells 118 and/or the plurality of second air cells 120 to atmosphere through the manifold 210 via tubes 122, 126.

In an embodiment of the disclosed subject matter, the control unit 204 is further configured to deflate the plurality of first air cells 118 for a first predetermined period of time ($T_1$). In an embodiment, $T_1$ may be less than about 10 seconds, and preferably about 5 seconds. After the control unit 204 deflates the plurality of first air cells 118 for $T_1$, the control unit 204 is further configured to inflate the plurality of second air cells 120 to the desired high pressure ($P_{HIGH}$). In an embodiment, $P_{HIGH}$ may correlate with the selectable firmness level as set forth in Table 1. The control unit 204 is then further configured to deflate the plurality of first air cells 118 to the desired low pressure ($P_{LOW}$). In an embodiment, $P_{LOW}$ may correlate with the selectable firmness level as set forth in Table 1. After deflation of the plurality of first air cells 118 to $P_{LOW}$, the control unit 204 is configured to hold each of the desired high pressure ($P_{HIGH}$) within the plurality of first air cells 118 and the desired low pressure ($P_{LOW}$) within the plurality of second air cells 120 for a second predetermined period of time ($T_2$). In a preferred embodiment, $T_2$ may be between about 5 to 60 seconds, and preferably one of about 5, 10, 15, 20, 25 and 30 seconds.

In an embodiment of the disclosed subject matter, after the control unit 204 holds $P_{HIGH}$ and $P_{LOW}$ for $T_2$, the control unit 204 is configured to alternate $P_{HIGH}$ and $P_{LOW}$ between the plurality of first air cells 118 and the plurality of second air cells 120 by repeating the steps above starting with the equalization operation discussed above. In an embodiment, the alternation mode may run for a predetermined period of alternation time or a predetermined number of alternation cycles.

In an embodiment of the disclosed subject matter, an airbed system, connectable to an air mattress, may comprise an air mattress comprising a plurality of first air cells alternately arranged between a plurality of second air cells, the plurality of first air cells having a first air pressure, the plurality of second air chambers having a second air pressure; a pressure sensor configured to obtain pressure measurements corresponding to the plurality first air cells and the plurality of second air cells; a control unit, comprising a processor, configured to operate a pump and valves of the airbed system to inflate and deflate the plurality of first air cells and the plurality of second air cells and to determine the first air pressure within the plurality of first air cells and the second air pressure within the plurality of second air cells; and wherein the control unit is further configured to, during an alteration process: (1) equalize the first air pressure and the second air pressure; (2) deflate the plurality of first air cells for a first predetermined period of time; (3) inflate the plurality of second air cells to a desired high pressure corresponding to a selectable firmness level; (4) deflate the plurality of first cells to a desired low pressure corresponding to the selectable firmness level; (5) hold the desired high pressure and the desired low pressure for a second predetermined period of time; (6) equalize the first air pressure and the second air pressure; (7) deflate the plurality of second air cells for the first predetermined period of time; (8) inflate the plurality of first air cells to the desired high pressure; (9) deflate the plurality of second cells to the desired low pressure; and (10) hold the desired high pressure and the desired low pressure for the second predetermined period of time. In an embodiment, the control unit 212 may be configured to repeat the alternation process for a predetermined period of alternation time or a predetermined number of alternation cycles.

In an embodiment of the disclosed subject matter, the control unit 204 may be further configured to, during an immersion process, inflate and/or deflate the plurality of alternating air cells 108 to the desired immersion pressure ($P_{IMMERSION}$) as set forth in Table 1 in accordance with the selectable firmness level. During the immersion process, a patient's body is enveloped upon the support surface 107. In an embodiment, the immersion process may run for a third predetermined period of time ($T_3$).

Figure 6:
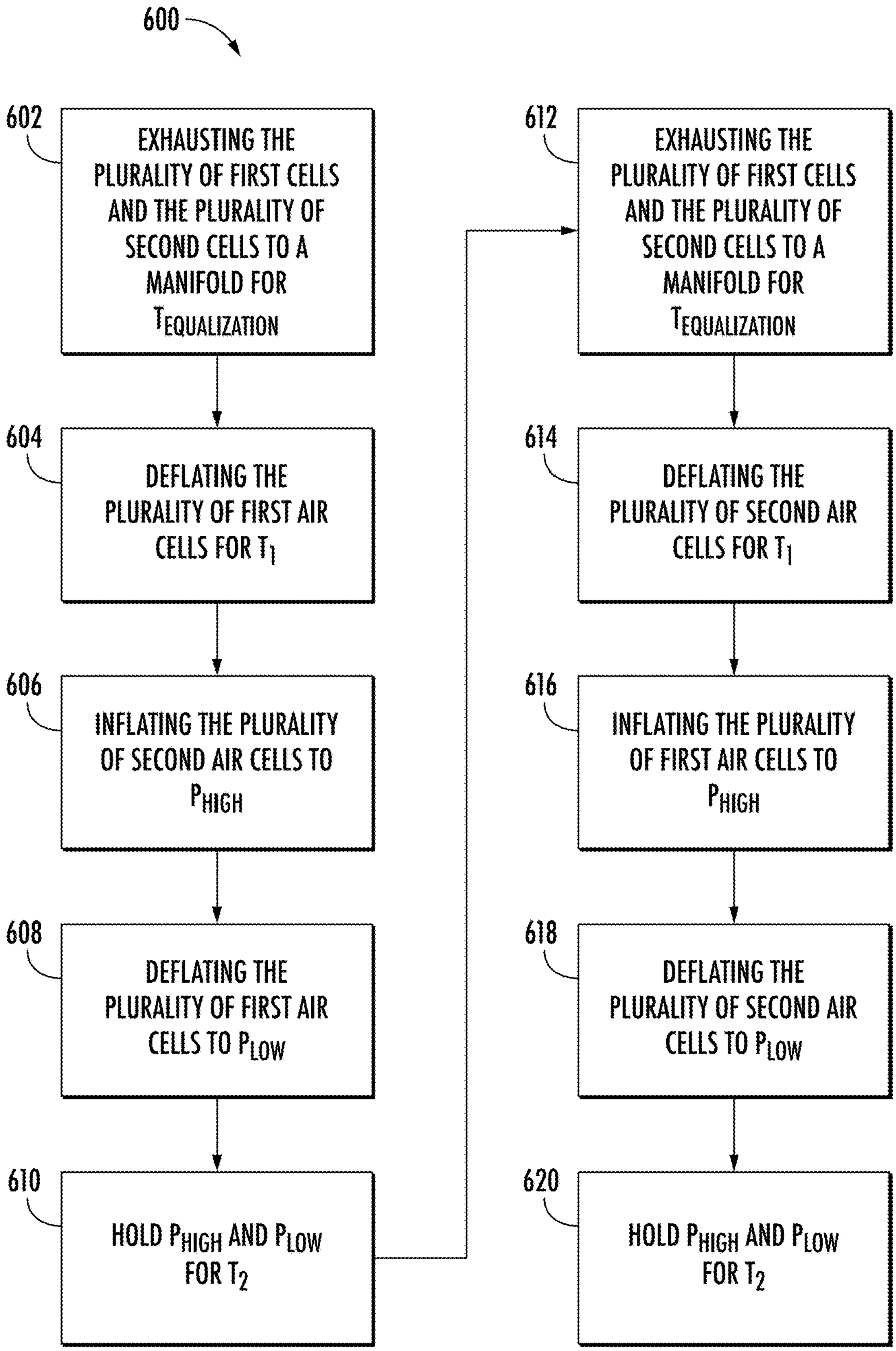
FIG. 6 is a flowchart illustrating an alternation process according to the embodiments of the describes principles.

FIG. 6 is flowchart 600 illustrating and exemplary method for alternating the pressure within an air mattress comprising a plurality of first cells having a first pressure and a plurality of second cells having a second pressure, wherein each of the air cells of the plurality of first air cells are adjacent to each of the air cells of the plurality of second air cells. At step 602, exhausting the plurality of first air cells and the plurality of second air cells to a manifold for a predetermined period of equalization time ($T_{EQUALIZATION}$). At step 604, deflating the plurality of first air cells for a first predetermined period of time ($T_1$). At step 606, inflating the plurality of second air cells to a desired high air pressure ($P_{HIGH}$). At step 608, deflating the plurality of first air cells to a desired low air pressure ($P_{LOW}$). At step 610, holding $P_{HIGH}$ and $P_{LOW}$ for a second predetermined period of time ($P_2$). At step 612, exhausting the plurality of first air cells and the plurality of second air cells to a manifold for $T_{EQUALIZATION}$. At step 614, deflating the plurality of second air cells for $T_1$. At step 616, inflating the plurality of first air cells to $P_{HIGH}$. At step 618, deflating the plurality of second air cells to $P_{LOW}$. At step 620, holding $P_{HIGH}$ and $P_{LOW}$ for $P_2$.

In an embodiment, after step 620, at least one of steps 602-620 may be repeated for a predetermined period of alternation time or a predetermined number of alternation cycles.

It is to be understood that while certain aspects of the disclosed subject matter have been shown and described, the disclosed subject matter is not limited thereto and encompasses various other embodiments and aspects.

What is claimed is:

1. An alternate pressure mattress system comprising:

an air mattress comprising a plurality of alternating air cells; wherein the plurality of alternating air cells comprise:

a plurality of first air cells; and a plurality of second air cells adjacent to the plurality of first air cells; and a control housing configured to alternate inflation and deflation of the plurality of first air cells and the plurality of second air cells based on a selectable firmness level, wherein the control housing is configured to exhaust the plurality of alternating air cells for a predetermined period of equalization time, deflate the plurality of first air cells for a first predetermined period of time, inflate the plurality of second air cells to the desired high pressure, deflate the plurality of first air cells to the desired low pressure, and hold the desired high pressure and the desired low pressure for a second predetermined period of time, and wherein the control housing is further configured to deflate the plurality of second air cells for a first predetermined period of time, inflate the plurality of first air cells to the desired high pressure, and deflate the plurality of second air cells to the desired low pressure.

2. The alternate pressure mattress system of claim 1, wherein the selectable firmness level corresponds to a desired immersion pressure, a desired high pressure, and a desired low pressure.

3. The alternate pressure mattress system of claim 2, wherein the desired immersion pressure is between about 7 to 42 mm Hg.

4. The alternate pressure mattress system of claim 2, wherein the desired high pressure is between about 13 to 48 mm Hg.

5. The alternate pressure mattress system of claim 2, wherein the desired low pressure is between about 4 to 34 mm Hg.

6. The alternate pressure mattress system of claim 1, wherein the predetermined period of equalization time is between about 45 to 50 seconds.

7. The alternate pressure mattress system of claim 1, wherein the first predetermined period of time is less than about 10 seconds.

8. The alternate pressure mattress system of claim 1, wherein the second predetermined period of time is between about 5 to 60 seconds.

9. The alternate pressure mattress system of claim 1, wherein the control housing comprises a pump connected to the plurality of first air cells and the plurality of second air cells.

10. The alternate pressure mattress system of claim 1, wherein the control housing comprises a pressure sensor to monitor a pressure status within the plurality of alternating air cells.

11. The alternate pressure mattress system of claim 9, wherein the control housing comprises a control unit configured to control the pump.

12. The alternate pressure mattress system of claim 11, further comprises a user remote configured to control the inflation and deflation of the air mattress.

13. A method of alternating a pressure within an air mattress comprising the steps of:

providing an air mattress comprising a plurality of first air cells and a plurality of second air cells adjacent to the plurality of first air cells;

selecting a firmness level for the air mattress; and alternating, via a control housing and based on the firmness level, inflation and deflation of the plurality of first air cells and the plurality of second air cells by:

exhausting the plurality of first air cells and the plurality of second air cells for a predetermined period of equalization time;

deflating the plurality of first air cells for a first predetermined period of time;

inflating the plurality of second air cells to a desired high pressure;

deflating the plurality of first air cells to a desired low pressure;

holding the desired high pressure in the plurality of second air cells and the desired low pressure in the plurality of first air cells for a second predetermined period of time;

exhausting the plurality of first air cells and the plurality of second air cells to the manifold for the predetermined period of equalization time;

deflating the plurality of second air cells for the first predetermined period of time;

inflating the plurality of first air cells to the desired high pressure;

deflating the plurality of second air cells to the desired low pressure; and holding the desired high pressure in the plurality of first air cells and the desired low pressure in the plurality of second air cells for the second predetermined period of time.

14. The method of alternating the pressure within an air mattress of claim 13, wherein the predetermined period of equalization time is between about 45 to 50 seconds.

15. The method of alternating the pressure within an air mattress of claim 13, wherein the first predetermined period of time is less than about 10 seconds.

16. The method of alternating the pressure within an air mattress of claim 13, wherein the second predetermined period of time is between about 5 to 60 seconds.

* * * * *